ELEVATOR CONTROL SYSTEM

Filed Aug. 15, 1960

STEPHEN ANTHONY HORNUNG INVENTOR

BY A. J. De Angelis ATTORNEY

United States Patent Office
3,022,865
Patented Feb. 27, 1962

3,022,865
ELEVATOR CONTROL SYSTEM

Stephen Anthony Hornung, New York, N.Y., assignor to Otis Elevator Company, New York, N.Y., a corporation of New Jersey Filed Aug. 15, 1960, Ser. No. 49,651
13 Claims. (Cl. 187—29)

Figure 1:
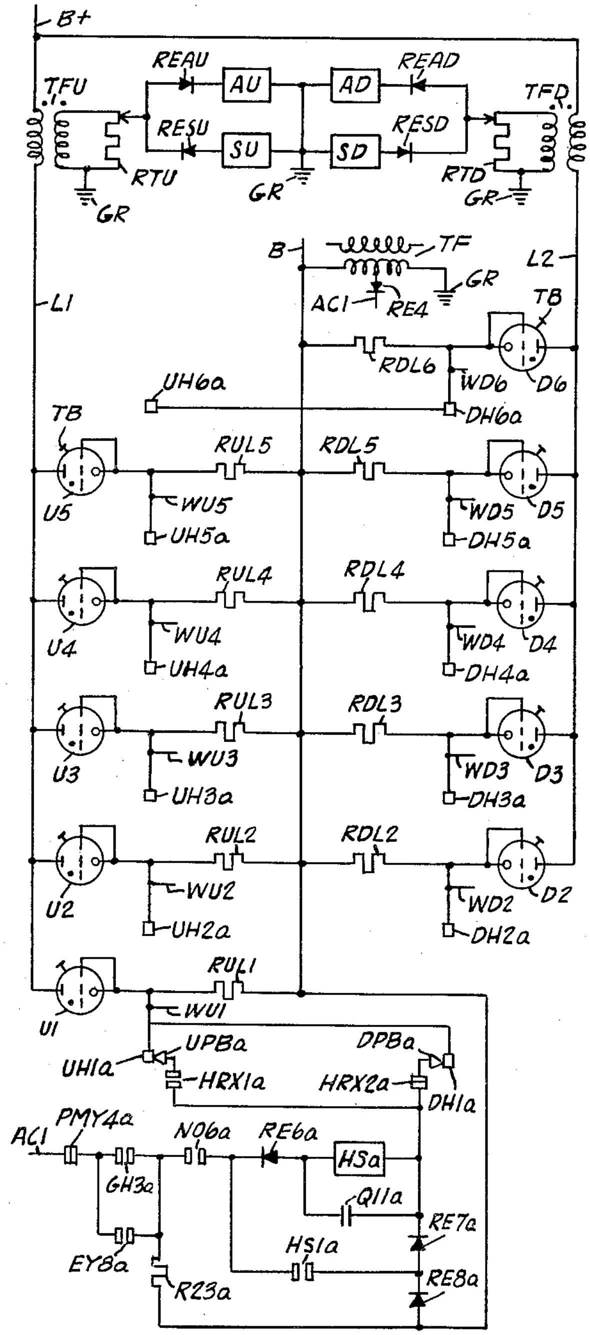

The invention relates to a system for controlling the operation of elevators and is especially adapted to detecting and algebraically totalizing calls for elevator service.

In the operation of elevators it frequently is desirable to detect the registration of calls for service to the various landings in the building and to maintain a continuous, accurate count of the number of such calls which are in registration. The subject invention makes this possible, and, although it is applicable to installations in which mechanical push buttons are used to register calls for service to the landings, it is especially applicable to systems in which calls for service are registered on electron emitting tubes. Such call buttons, termed "touch buttons," are described and disclosed in Patents #2,525,767, #2,525,768 and #2,525,769 issued to W. H. Bruns.

In the past, attempts have been made to detect and count the registration of calls in such touch button arrangements. For example, the coil of an electromagnetic relay has been connected in the common power line to the buttons and the relay caused to operate upon the registration of a call. However, such an arrangement merely detects the registration of the first call registered and, once the relay is in operated condition, does not detect the registration of subsequent landing calls.

In order to detect the registration of more than one call and to count the number of calls registered, the coils of a plurality of current sensitive relays have been connected in series in the common power line, each of the relays being operable by different values of current flowing through their respective coils. With the latter arrangement, a first relay operates upon the registration of one call, a second relay operates when, say, two calls are registered and a third relay operates when, say, three calls are registered. However, such an arrangement requires extremely accurate relays, especially, if it is desired to count calls algebraically; for to count calls algebraically, the relays must be of the type which release at just slightly less than their operate values. Furthermore, since each call registration or cancellation produces a relatively small change in the magnitude of the line current (approximately 20 to 25 milliamperes) the relays must be quite sensitive and are relatively expensive.

In addition, the use of a series of current sensitive relays has its physical limitations in the number of calls that can be counted. For more than a relatively few calls the percentage increase in the total line current becomes very small. It is questionable whether relays could operate on such a small differential; and, in any event, the opportunity for error becomes large.

It is therefore an object of the invention to provide a call detecting system which is extremely accurate and relatively inexpensive.

It is another object of the invention to provide means for counting a large number of calls for elevator service and for algebraically totalizing such calls.

It is still another object of the invention to provide a call detecting and call totalizer system of simple construction for use with call registering mechanism actuated by human touch.

The invention provides means for generating pulses in response to small changes in the current flowing in the common feed line of call registering circuits. Positive pulses are generated upon the registration of service calls and negative pulses are generated upon their cancellation. Negative and positive pulse detectors actuate a pulse counter, causing the counter to add in response to the positive pulses detected, and to subtract in response to the negative pulses detected; thereby providing a total of the number of calls in registration at any given instant.

Features and advantages of the invention will be seen from the above, from the following description of the operation of the preferred embodiment when considered in conjunction with the drawings and from the appended claims.

Figure 2:
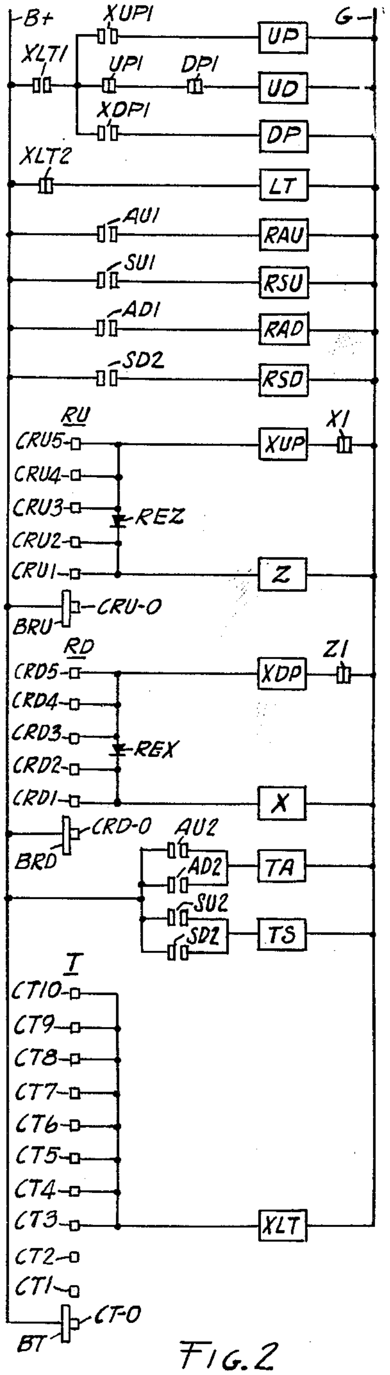

In the drawings:

FIGURE 1 is a simplified schematic wiring diagram of landing call pickup and cancelling circuits for one car of a group; and landing call registering and landing calls in registeration circuits common to all cars of the group; along with the pulse generating and detecting mechanism circuits associated with up and down landing calls; and FIGURE 2 is a simplified schematic wiring diagram of automatic program selecting circuits and pulse algebraic counting circuits.

The detection and algebraic counting of registered calls may be used to provide various control functions. By way of example, the subject system will be described as controlling, in accordance with the number of landing calls in registration, the automatic selection of a program of operation for a group of elevator cars. For simplicity, the system will be described as being applied to the elevator control system disclosed in the U.S. Patent #2,682,318 issued to W. F. Glaser et al. This patent discloses a group of three elevator cars (designated *a*, *b* and *c*), operating in accordance with any one of four predetermined programs; a particular program of operation being selected manually. The four programs are: a light traffic program, used during periods of extremely light traffic; an up peak one for periods of predominantly up traffic; a down peak one for periods when down traffic predominates, and an up-down one for periods when traffic in the up direction substantially balances that in the down direction. An electromagnetic switch is provided for each program. These switches are designated LT for the light traffic program, UP for the up peak program, DP for the down peak program and UD for the up-down or balanced program.

The circuits for the actuating coils of these program switches are shown, arranged in accordance with the subject invention, in the uppermost portion of FIGURE 2 of the drawings. It is to be understood that energization of a coil of a program switch operates that switch, and causes the cars to operate in accordance with the program associated with the operated switch in the manner described and disclosed in the aforementioned Glaser et al. patent. With the subject arrangement these program switch coils are energized selectively and automatically in accordance with the number of landing calls in registration to select the program under which the cars are to operate. The cars are transferred from one program of operation to another, as the number of calls in registration changes.

By way of illustration, the system is disclosed as applied to a building having six landings, and landing call touch buttons for both the up and down directions of travel. It is to be understood the system can be utilized in a building having any number of landings, and will be of increased utility as the number of landings is increased.

Unidirectional power is supplied over lines B+ and B to the circuits of FIGURE 1. Up landing call and down landing call touch buttons are designated U and D, respectively, numerals being appended for indicating the landings for which the buttons are provided. Each of these landing call buttons U and D comprise a cold cathode gas tube, such as the RCA 1C21 type, and a fixed button TB connected to the tube envelope with the circuits arranged so that the tube conducts in response to the touch of a finger on the button TB and remains conducting, thereby registering the call and enabling the touch to be discontinued. The primary of transformer TF may be supplied with alternating current from any suitable source to provide alternating current for the gas tube firing circuits and, over line AC1, to provide rectified voltage for the automatic call cancelling circuits to extinguish the tubes. Load resistors connected in the cathode circuits of up landing tubes U1–U5 and down landing tubes D2–D6 are designated RUL1–5 and RDL2–6, respectively.

The landing call pickup and call cancelling circuits are shown for only car "*a*" of the group; it being understood that similar circuits (not shown) are provided for cars "*b*" and "*c*." The landing call pickup and cancelling circuits for car "*a*" are the same as those disclosed and described in the aforementioned Glaser et al. patent, and the same circuit element designations have been retained herein. As is there disclosed each car is provided with a selector machine upon which are mounted stationary contacts UH and DH (with numeral suffixes indicating the landings with which they are associated) in position to be engaged by brushes UPB*a* and DPB*a*, respectively. Both brushes are mounted on the advancer panel of the selector and are shown for the condition of the car standing at the first landing. Stationary contacts UH1*a* through UH5*a* are connected to the cathode electrodes of touch button tubes U1 to U5, respectively, while stationary contacts DH2*a* through DH6*a* are connected to the cathode electrodes of touch button tubes D2 to D6, respectively. Stationary contacts DH1*a* and DH6*a* are cross connected to stationary contacts UH1*a* and UH6*a*, respectively. The landing call registering circuits are common to all cars of the group and are connected to selectors (not shown) for cars "*b*" and "*c*" by means of connecting wires WU and WD. PMY4*a*, GH3*a*, EY8*a*, NO6*a*, HRX1*a* and HRX2*a* designate contacts of switches, the actuating coil circuits of which are described and disclosed in the aforementioned Glaser et al. patent. The structure and operation of the landing call registering circuits, landing call pickup and automatic landing call cancelling circuits are more fully disclosed and described in the aforementioned Glaser et al. patent.

TFU designates a transformer the primary winding of which is connected to the B+ power line L1, which line is common to the anode electrodes of up landing call tubes U1 to U5. Its secondary winding is connected across a resistor RTU, one side of which is connected to ground GR. An adjustable tap on resistor RTU is connected through rectifier REAU to one side of coil AU of the up landing call registration detector switch, and through rectifier RESU to one side of coil SU of the up landing call cancellation detector switch. The other side of coils AU and SU are connected to ground GR. This circuit detects the registration and cancellation of up landing calls, as will be explained hereinafter.

A similar circuit for detecting the registration and cancellation of down landing calls is connected to B+ power line L2, which line is common to the anode electrodes of down landing call tubes D2 to D6. The transformer is designated TFD, the resistor RTD and the rectifiers READ and RESD. AD designates the coil of the down landing call registration detector switch and SD the coil of the down landing coil cancellation detector switch. The aforementioned switches AU, SU, AD and SD are of the electromagnetic type.

Unidirectional power is supplied over lines B+ and G to the circuits of FIGURE 2. The actuating coil circuits for program switches UP, UD and DP and LT are shown in the uppermost part of FIGURE 2. Also shown are the circuits of three bidirectional stepping switches, generally designated RU, RD and T, which switches are used to count the number of landing calls in registration, as will be explained hereinafter. Stepping switch RU is provided with operating coils RAU, RSU; a series of stationary contacts CRU–0 to 5, and brush BRU adapted successively to engage the stationary contacts. Brush BRU is elongated sufficiently to span two adjacent stationary contacts to maintain circuit continuity while a stepping operation takes place. Energization of operating coil RAU causes stepping operation of brush BRU upward, while energization of operating coil RSU causes stepping operation of brush BRU downward. Bidirectional stepping switches RD and T are similar to switch RU in their construction and operate in a similar manner. Coils RAD and RSD of stepping switch RD, and coils TA and TS of stepping switch T control, respectively, the upward and downward movement of their associated brushes BRD and BT.

Coil XUP of the auxiliary up peak traffic switch and coil Z of the up call switch are connected electrically to stationary contacts CRU–1 to 5 of stepping switch RU. Coil XDP of the auxiliary down peak traffic switch and coil X of the down call switch are electrically connected to stationary contacts CRD1 to 5 of stepping switch RD. Coil XLT of the auxiliary light traffic switch is connected to the stationary contacts CT–3 to 10 of stepping switch T. REZ and REX designate blocking rectifiers.

In the drawings, all contacts of electromagnetic switches bear the same identifying letters, as are applied to their respective actuating coils, with reference numerals appended thereto to differentiate between different sets of contacts on the same switch, and are all shown for the unoperated condition of their respective switches.

An understanding of the invention will be facilitated by first describing the registration of landing calls. With reference to FIGURE 1, it is to be noted that the anode-cathode circuit of the tube of each landing button is from line B+ through the tube and a load resistance (RUL, RDL) to line B. The direct current voltage applied across the tube is not sufficient in itself to cause the tube to conduct. However, when an intending passenger touches the landing button, a circuit is established from ground GR through the secondary of transformer TF to line B which is connected through the direct current power source and line B+ to the anode of the tube and thence from the tube envelope by way of the body capacity of the intending passenger back to ground. As a result of applying the alternating voltage between the anode and the tube envelope while the B+ potential exists across the anode-cathode electrodes the tube conducts. Conduction is then sustained by the B+ potential, allowing the touch to be discontinued.

Assume that an intending passenger at the fourth landing touches up landing button U4, causing tube U4 to conduct. As tube U4 conducts, a certain amount of current, say 25 milliamps (for the circuit parameters usually used in touch button circuits), flows in its anode-cathode circuit and in the B+ power line L1. The current flowing in the anode-cathode circuit of tube U4 also causes a certain potential to appear across loading resistor RUL4, registering the call on stationary contact UH4*a*. As additional up call buttons are touched the corresponding tubes conduct to cause successive 25 milliampere increases in the current flowing in the B+ power line L1.

Similarly, the current flowing in B+ power line L2 is increased in 25 milliampere steps as successive down landing calls are registered on tubes D2 to D6.

The pickup and cancellation of a landing call by the car causes a corresponding 25 milliampere decrease in the total current flowing in the associated B+ power line. Assume that an up landing call has been registered at the fourth landing, and that the car has been started upward from the first landing and is travelling toward that landing. As is described in the aforementioned Glaser et al. patent, as car "*a*" travels upward, up landing call pickup brush UPB*a* and down landing call pickup brush DPB*a* (mounted on the advancer panel of the selector machine) move upward ahead of the relative position of the car. Non-stop relay NO (not shown) is in operated condition, maintaining its contacts NO6*a* engaged. Auxiliary speed switch EY*a* (not shown) is in operated condition, maintaining its contacts EY8*a* engaged. Pawl magnet relay PMY*a* (not shown) is in operated condition, maintaining its contacts PMY4*a* separated. Auxiliary highest call reversal switch HRX (not shown) is in operated condition, maintaining its contacts HRX1*a* engaged and its contacts HRX2*a* separated; thereby enabling brush UPB*a* to pick up landing calls and disabling the down landing call pickup and cancelling circuits.

Upon engagement of brush UPB*a* with stationary contact UH4*a*, a circuit is completed which connects coil HS*a* of the auxiliary stop relay across loading resistor RUL4, the circuit being from the left-hand side of load resistor RUL4 through stationary contact UH4*a*, brush UPB*a*, contacts HRX1*a*, coil HS*a*, rectifier RE6*a*, contacts NO6*a*, resistor R23*a* to line B and thence back to the right-hand side of resistor RUL4. The potential across resistor RUL4 thus applied to coil HS*a* is of sufficient magnitude to operate this relay. Upon operation, relay HS*a*, as is described in the aforementioned Glaser et al. patent, causes the advancer panel to stop with brush UPB*a* in engagement with stationary contact UH4*a*, and initiates the slowdown and stopping of car "*a*" at the fourth landing.

Relay HS*a* also engages its contacts HS1*a*, preparing the call cancelling circuit of car "*a*." Incident to the initiation of slowdown, as described in the aforementioned Glaser et al. patent, pawl magnet relay PMY*a* (not shown) releases. This relay engages its contacts PMY4*a*, completing an automatic call cancelling circuit for tube U4, the circuit extending from the tap on the secondary winding of transformer TF through rectifier RE4, by way of line AC1 through contacts PMY4*a*, EY8*a*, NO6*a* and HS1*a*, rectifier RE7*a*, contacts HRX1*a*, brush UPB*a* and stationary contact UH4*a* to the cathode electrode of the tube of button U4. Rectifier RE4 passes the positive halves of the alternating voltage cycle, thus raising the potential of the cathode electrode with respect to the anode electrode to a point where the voltage across tube U4 is reduced below its sustaining value and conduction is extinguished. Thus, the up landing call at the fourth landing is automatically cancelled as soon as the call is picked up and slowdown is initiated. This cancellation causes a decrease of approximately 25 milliamps in the current flowing in B+ power line L1.

Relay HS*a* releases incident to the cancelling of the call. Rectifier RE6*a* blocks the flow of current from line AC1 through the coil of relay HS*a*, preventing relay HS*a* from being held in or reoperated, while the car is at the fourth landing.

When car "*a*" is conditioned for down travel, auxiliary highest call reversal switch HRX*a* (not shown) is in released condition, as described in the aforementioned Glaser et al. patent. Its contacts HRX1*a* are open, preventing the pickup and cancellation of up landing calls, and its contacts HRX2*a* are engaged, enabling brush DPB*a* to pick up and cancel down landing calls, as it engages stationary contacts DH2*a* to DH6*a*, in the same manner as described for the pickup and cancellation of up landing calls.

Cancellation of a down landing call with the consequent cessation of conduction in the corresponding down landing call tube causes a decrease of approximately 25 milliamperes in the current flowing in B+ power line L2.

The registrations of landing calls are detected and algebraically counted as follows: As an up landing call is registered by an intending passenger the corresponding tube is rendered conductive and the amount of current flowing in B+ power line L1 is increased. The change in current flowing through the primary winding of transformer TFU causes a pulse of current to be generated in its secondary winding. This pulse, because of the manner in which the windings of transformer TFU are wound, causes an electric transient of characteristic form, such as a pulse of voltage of positive polarity with respect to ground GR to appear across resistor RTU. This positive polarity pulse is of sufficient magnitude, when applied across coil AU of the up landing call registration detector switch, to cause its momentary operation. The circuit extends from the tap on resistor RTU through rectifier REAU, coil AU and through ground GR back to the grounded side of resistor RTU. Blocking rectifier RESU prevents voltage pulses of positive polarity from affecting coil SU of the up landing call cancellation detector switch.

Switch AU, upon operation, engages its contacts AU1, momentarily completing a circuit for operating coil RAU of stepping switch RU. This pulsing of coil RAU causes stepping operation of brush BRU upward into engagement with stationary contact CRU1; the position of the brush on contact CRU1 indicating that one up landing call is in registration.

Switch AU also momentarily engages its contacts AU2 in the circuit of coil TA of stepping switch T. The pulsing of coil TA causes stepping operation of brush BT upward into engagement with stationary contact CT1, the position of the brush on the contact also indicating that one landing call is in registration.

In a similar manner, the subsequent registration of a second up landing call causes up landing call registration detector switch AU to be momentarily reoperated. This causes another stepping operation of brush BRU of stepping switch RU upward into engagement with stationary contact CRU2*a*, and causes stepping operation of brush BT of stepping switch T upward into engagement with stationary contact CT2, indicating that two landing calls are now in registration.

It may be noted that each time an additional up landing call is registered, it is counted by means of brush BRU of stepping switch RU and brush BT of stepping switch T moving upward one position on their respective stationary contacts. In this manner, the number of up landing calls in registration are counted by both stepping switches.

If now one of the previously registered up landing calls is cancelled, there is a decrease in the amount of current flowing in B+ power line L1 and in the primary winding of transformer TFU. This transformer generates in its secondary winding a corresponding pulse of current which in turn causes an electric transient of different characteristic form, such as a pulse of voltage of negative polarity with respect to ground GR to appear across resistor RTU. This voltage pulse when applied across coil SU of the up landing call cancellation detector switch causes its momentary operation. The circuit extends from the grounded side of resistor RTU through ground GR, through coil SU and rectifier RESU to the tap on the other side of resistor RTU. Blocking rectifier REAU prevents voltage pulses of negative polarity from affecting coil AU.

Switch SU momentarily engages its contacts SU1 in the circuit of coil RSU of bidirectional stepping switch RU. This causes stepping operation of brush BRU downward into engagement with stationary contact CRU1, thereby indicating that an up landing call has been cancelled and reducing the count of the number of up landing calls then in registration to one.

Switch SU also momentarily engages its contacts SU2 in the circuit of pulsing coil TS of bidirectional switch T. This causes stepping operation of brush BT downward into engagement with stationary contact CT1, indicating that a landing call has been cancelled and reducing the count of the total number of landing calls then in registration to one.

The subsequent cancellation of the remaining up landing call in registration, in a similar manner, causes stepping operation of brushes BRU and BT back to their respective home positions, thereby indicating that there are no landing calls in registration.

As has been previously described, the registration of a down landing call causes a certain increase in the amount of current flowing in line L2, and the cancellation of a down landing call causes a certain decrease in the amount of current flowing in line L2. The registration and cancellation of down landing calls are algebraically counted by detecting such increases and decreases in a similar manner as that described for the detection of the registration and cancellation of up landing calls. This is accomplished by means of transformer TFD which, in response to an increase in current flow in line L2, generates a positive pulse which applies a potential of positive polarity with respect to ground GR across resistor RTD and, in response to a decrease in current flow in line L2, applies a voltage pulse of negative polarity with respect to ground GR across resistor RTD. By means of blocking rectifiers READ and RESD, voltage pulses of positive polarity, appearing across resistor RTD, are applied across coil AD of the down landing call detector switch, while voltage pulses of negative polarity appearing across resistor RTD are applied across coil SD of the down landing call cancellation detector switch.

Thus, the registration of a down landing call causes switch AD momentarily to operate its contacts AD1 and AD2, thereby pulsing coils RAD and TA of bidirectional stepping switches RD and T. This causes stepping operations of brushes BRD and BT into engagement with stationary contacts CRD1 and CT1; indicating that one down landing call is in registration, and (on CT1) that a total of only one landing call exists in the system.

In a manner similar to that explained for the cancellation of up calls, the cancellation of this only existing down call causes the brushes BRD and BT to be returned to their zero indicating positions CRD–0 and CT–0.

From the foregoing it will be seen that bidirectional stepping switch RU gives an indication of the number of up landing calls in registration at a given instant, bidirectional stepping switch RD indicates the number of down landing calls in registration at that time and bidirectional switch T indicates the total number of up and down landing calls then in registration.

For purposes of this disclosure it will be assumed the cars operate in accordance with the light traffic program when the total number of up and down landing calls in registration is less than a certain minimum, say less than three calls. Under conditions where the landing calls in registration exceed, say two, and there is an absence of traffic which predominates in either the up or down direction, the cars operate according to the up-down program. Also, when a certain number of up landing calls, say three, is registered, under conditions where there are no down landing calls registered, the system is transferred to the up peak program. Similarly, when the opposite condition exists, that is, a certain number of down landing calls, say three, is in registration, and no up landing calls are registered, the system operates on the down peak program. The cars are transferred from one program of operation to another automatically, as the number of calls in registration varies.

The automatic selection of a program of operation is accomplished as follows: Assume that there are no landing calls in registration. Under such conditions, brush BT of bidirectional switch T is in its home position, engaging stationary contact CT–0, and auxiliary light traffic switch XLT is in released condition. Switch XLT, when in released condition, maintains its contacts XLT2 engaged, completing a circuit from line B+ to G for coil LT of the light traffic switch. Thus, switch LT is in operated condition, causing the cars to operate in accordance with the light traffic program, as disclosed in the aforementioned Glaser et al. Patent.

Next assume that an up landing call and a down landing call are registered in that order. As previously described, registration of the up landing call causes brush BRU of stepping switch RU to step into engagement with stationary contact CRU1, completing a circuit from line B+ to line G for the coil Z of the up call switch. Blocking rectifier REZ prevents the flow of current from brush BRU through coil XUP of the auxiliary up peak traffic switch. Switch Z operates, separating its contact Z1 in the circuit of coil XDP of the auxiliary down peak traffic switch for purposes to be explained later. Registration of the up landing call also causes upward stepping operation of brush BT of stepping switch T into engagement with stationary contact CT1 to count the landing call.

Registration of the down landing call causes upward stepping operation of brush BRD of stepping switch RD into engagement with stationary contact CRD1, thereby indicating that a down landing call is registered, and completing a circuit from line B+ to G for coil X of the down call switch. Blocking rectifier REX prevents the flow of current from brush BRD through coil XDP of the auxiliary down peak traffic switch. Switch X operates, separating its contacts X1 in the circuit of coil XUP of the auxiliary up peak traffic switch for purposes to be explained later. Registration of the down landing calls also causes a second stepping operation upward of brush BT of stepping switch T into engagement with stationary contact CT2, indicating that a total of two landing calls are now in registration.

The registration of a second up landing call causes stepping operation upward of brush BRU of stepping switch RU into engagement with stationary contact CRU2 (indicating that two up landing calls are in registration), and also causes brush BT of stepping switch T to step upward into engagement with stationary contact CT3 (indicating that a total of three landing calls are now in registration). This latter step completes a circuit from lines B+ to G for coil XLT of the auxiliary light traffic switch. Switch XLT operates, separating its contacts XLT2 to interrupt the circuit for coil LT, and engages its contacts XLT1, completing a circuit through contacts UP1 and DP1 for coil UD of the up-down traffic switch. Light traffic switch LT releases and up-down traffic switch UP operates, transferring the cars to the up-down or balanced program of operation, as described in the aforementioned Glaser et al. patent.

Next assume that a third up landing call is registered, causing brush BRU of stepping switch RU to step upwardly into engagement with stationary contact CRU3, thereby indicating that three up landing calls are registered. The position of brush BRU is without effect on coil XUP of the auxiliary up peak traffic switch, since, as previously stated, contacts X1 are presently separated. The registration of the third up landing call also causes brush BT of stepping switch T to step upwardly into engagement with stationary contact CT4, thereby indicating that four landing calls are in registration.

If, now, the previously registered down landing call is canacelled, brush BRD of stepping switch RD moves downwardly into engagement with its home contact CDR–0, thereby indicating there are no down landing calls in registration. As brush BRD moves out of engagement with stationary contact CRD1, the circuit for coil X of the down call switch is interrupted, causing the switch to release. The cancellation of the down landing call, as previously described, also causes brush BT of stepping switch T to step downwardly into engagement with stationary contact CT3, thereby subtracting the cancelled down landing call from the total of the number of landing calls in registration leaving a total of three calls.

Down call switch X, upon releasing, engages its contacts X1, thereby completing a circuit for coil XUP of the auxiliary up peak traffic switch, the circuit extending from line B+ through brush BRU in engagement with stationary contact CRU3, through coil XUP and contacts X1 to line G. Switch XUP operates, engaging its contacts XUP1, thereby completing a circuit through contacts XLT1 for coil UP of the up peak traffic switch. Switch UP operates, separating its contacts UP1, thereby interrupting the circuit for coil UD of the up-down traffic switch which releases. As described in the aforementioned Glaser et al. patent, as switch UP operates and switch UD releases, the cars are transferred from the up-down program of operation to the up peak program of operation. Thus, the cars operate in accordance with the up peak program when three or more landing calls are in registration and no down landing calls are registered.

Next assume the registration of a down landing call. This causes brush BRD to move upwardly into engagement with stationary contact CRD1 of stepping switch RD, causing down call switch X to reoperate. This switch separates its contacts X1, interrupting the circuit for coil XUP of the auxiliary up peak traffic switch. Switch XUP releases, separating its contacts XUP1, thereby interrupting the circuit for coil UP of the up peak traffic switch. Switch UP releases, engaging its contacts UP1 to complete a circuit through contacts XLT1 and DP1 for coil UD of the up-down traffic switch which operates. This transfers the cars back to the up-down program of operation.

The registration of the last mentioned down landing call also causes brush BT of stepping switch T to step upwardly into engagement with stationary contact CT4, indicating that there are now four landing calls in registration.

If it is now assumed that two more down landing calls are registered, brush BRD of stepping switch RD will step upwardly into engagement with stationary contact CRD3 (indicating that there are three down landing calls in registration) but this is without effect on coil XDP of the auxiliary down peak traffic switch, since, as previously stated, contacts Z1 of the up call switch are presently separated.

The registration of these two additional down landing calls also causes brush BT of stepping switch T to step upwardly into engagement with stationary contact CT6, the position of brush BT indicating that there are now a total of six landing calls in registration.

After an interval the three up landing calls in registration are cancelled by up travelling cars and brush BRU of stepping switch RU steps downwardly from stationary contact CRU3 into engagement with its home contact CRU-0. As brush BRU moves off of stationary contact CRU1, the circuit for coil Z of the up call switch is interrupted, causing the switch to release.

Cancellation of the three up landing calls also causes brush BT of stepping switch T to step downwardly from stationary contact CT6 to contact CT3; the new position of brush BT indicating that there are now three landing calls in registration.

Switch Z, upon releasing, engages its contacts Z1, completing a circuit for coil XDP of the auxiliary down peak traffic switch, the circuit extending from line B+ through brush BRD in engagement with stationary contact CRD3, through coil XDP and contacts Z1 to line G. Switch XDP operates, engaging its contacts XDP1, thereby completing a circuit through contacts XLT1 for coil DP of the down peak traffic switch. Switch DP operates, separating its contacts DP1, thereby interrupting the circuit for coil UD of the up-down traffic switch which releases. Upon switch UD releasing and switch DP operating, the cars are transferred from the up-down program to the down peak program, as described in the aforementioned Glaser et al. patent.

The cars remain on the down peak program so long as there are three or more down landing calls in registration and an absence of up landing calls.

The registration of an up landing call now causes brush BRU of stepping switch RU to step upwardly into engagement with stationary contact CRU1 and completes a circuit for coil Z of the up call switch. Switch Z operates, separating its contacts Z1, thereby interrupting the circuit for coil XDP. Switch XDP releases, separating its contacts XDP1, thereby interrupting the circuit for coil DP. Switch DP releases, engaging is contacts DP1, thereby completing the circuit for coil UD of the up-down traffic switch which operates. As switch DP releases and switch UD operates, the cars are transferred back to the up-down program.

Next assume that with three down landing calls in registration, one of these down calls is cancelled instead of an up landing call being registered, as was assumed in the previous example. Cancellation of that down landing call causes brush BRD of stepping switch RD to step downwardly out of engagement with stationary contact CRD3 and into engagement with stationary contact CRD2, the position of brush BRD indicating that there are two down landing calls in registration. As brush BRD moves off of contact CRD3, the circuit for coil XDP is interrupted; blocking rectifier REX preventing the flow of current through coil XDP from stationary contact CRD2. Cancellation of the down landing call also causes brush BT of stepping switch T to step downwardly from stationary contact CT3 into engagement with contact CT2, the position of brush BT, indicating that there are now two landing calls in registration. As brush BT moves out of engagement with stationary contact CT3, the circuit for coil XLT of the auxiliary light traffic switch is interrupted. Switch XLT releases, separating its contacts XLT1, thereby interrupting the circuit for coil DP of the down peak traffic switch, and engages its contacts XLT2, completing a circuit for coil LT of the light traffic switch. Switch DP releases and switch LT operates, causing the cars to be transferred from the down peak program to the light traffic program, as described in the aforementioned Glaser et al. patent.

It is seen that the registration and cancellation of up and down landing calls is detected, the calls counted algebraically and the resultant information used to control automatically the selection of operating programs for a group of cars. The subject call detector and totalizer likewise may be used to count car calls algebraically, car call registering and cancelling circuits being similar to the landing call circuits described herein. The information obtained by the subject device may also be used for numerous control functions, such as removing cars from group operation, varying the interval which must expire between the dispatching of successive cars, etc. or, such information may be obtained merely to check the operation of an installed system, and the observations of such operation may then be used to improve that system or the design of future elevator control systems.

Although, as a preferred embodiment, the invention has been described as using bidirectional stepping switches, it will be understood that chain or ring type electronic counters or their magnetically actuated equivalent may be used for the temporary storage of the call information. Similarly other changes can be made in the above described construction and many apparently different embodiments of this invention can be made without departing from the scope thereof. It is intended that all matter contained in the above description or shown on the accompanying drawings be interpreted as illustrative only and not in a limiting sense.

What is claimed is:

1. In an elevator installation in which elevators serve a plurality of landings each of which landings has a means for registering a demand for service, said means being supplied with electric power from a common source, each elevator having means for initiating stopping of the car at a landing for which a service demand is registered and for cancelling said demand as the stop is being made, means responsive to the increase and decrease in current flowing from said source in response to the registration and cancellation, respectively, of each demand for producing an electrical transient of characteristic form coincident with each such registration and in response to the cancellation of each service demand for producing a differently characterized electrical transient as each such cancellation occurs, and means responsive to said characteristic and differently characterized electric transients to produce an indication of the number of service demands remaining in registration at any instant.

2. In an elevator installation in which elevators serve a plurality of landings, each of which landings has a means for registering a demand for service, said means being supplied with electric power from a common source, each elevator having means for initiating stopping of the car at a landing for which a service demand is registered and for cancelling said demand as the stop is being made, means responsive to certain variations in current flowing from said source in response to the registration and cancellation of each demand for producing coincident with each such registration an electrical transient of characteristic form and in response to the cancellation of each service demand for producing a differently characterized electrical transient as each such cancellation occurs, means responsive to said characteristic and differently characterized electric transients to produce an indication of the number of service demands remaining in registration at any instant, and elevator control means responsive to said produced indications to cause said cars to operate in accordance with predetermined modes as said indications vary.

3. In an elevator installation in which elevators serve a plurality of landings, each of which landings has a means for registering a demand for service, said means being supplied with electric power from a common source, each elevator having means for initiating stopping of the car at a landing for which a service demand is registered and for cancelling said demand as the stop is being made; means responsive to the increase in current flowing from said source in response to the registration of each demand for producing an electrical transient of characteristic form coincident with each such registration, and to a decrease in said current flowing in response to the cancellation of each service demand for producing a differently characterized electrical transient as each such cancellation occurs; means responsive to said characteristic and differently characterized electric transients to produce an indication of the number of service demands remaining in registration at any instant, and elevator control means responsive to said produced indications to cause said cars to operate in accordance with predetermined modes as said indications vary.

4. In an elevator installation in which an elevator car serves a plurality of landings, a plurality of service call registering means, one for each of said landings, call pickup mechanism for said car for initiating stopping of that car at landings for which said service calls are registered, call cancelling means responsive to operation of said call pickup means for cancelling the registration of the service calls registered for landings at which the car is to stop, pulsing means responsive to the registration and cancellation of said service calls for generating a pulse of a given polarity upon the registration of a service call and a pulse of a polarity opposite to said given polarity upon the cancellation of a service call, means for detecting said pulses of a given polarity, means for detecting said pulses of opposite polarity, and counting mechanism operatively responsive to both said pulse detecting means for algebraically counting said pulses of a given polarity and of opposite polarity for indicating said service calls in registration at any given instant.

5. In an elevator installation in which an elevator car serves a plurality of landings, a plurality of landing call registering means, one for each of said landings, call pickup mechanism for said car for initiating stopping of that car at landings for which landing calls are registered, call cancelling means responsive to operation of said call pickup means for cancelling the registration of the landing calls registered for landings at which the car is to stop, pulsing means responsive to the registration and cancellation of said landing calls for generating a positive pulse upon registration of a landing call and a negative pulse upon cancellation of a landing call, positive pulse detecting means, negative pulse detecting means, and counting mechanism operatively responsive to said positive and negative pulse detecting means for algebraically counting said positive and negative pulses, thereby indicating the number of landing calls in registration at any given instant.

6. In an elevator installation in which an elevator car serves a plurality of landings; a plurality of service call registering means; one for each of said landings and each including a touch button tube adapted to be rendered conductive by human touch to register a call for the landing with which it is associated and then remain conducting after said touch is discontinued to maintain said registration; call pickup mechanism for said car for initiating stopping of that car at landings for which said service calls are registered; call cancelling means responsive to operation of said call pickup means for extinguishing the touch button tubes provided for landings at which the car is to stop for cancelling the registration of the service calls registered for such landings; pulsing means responsive to the registration and cancellation of said service calls for generating a pulse of a given polarity upon the registration of a service call and a pulse of a polarity opposite to said given polarity upon the cancellation of a service call; means for detecting said pulses of a given polarity; means for detecting said pulses of opposite polarity; and counting mechanism operatively responsive to both said pulse detecting means for algebraically counting said pulses of a given polarity and of opposite polarity for indicating the service calls in registration at any given instant.

7. In an elevator installation in which an elevator car serves a plurality of landings; a plurality of first control means, one for each of said landings, for registering up landing calls in response to human touch; a plurality of second control means, one for each of said landings, for registering down landing calls in response to human touch; call pickup mechanism for said car for initiating, during upward travel of said car, stopping of that car at landings for which up landing calls are registered, and, during downward travel of said car, stopping of that car at landings for which down landing calls are registered; call cancelling means responsive to operation of said call pickup means for cancelling the registration of the landing calls registered for landings at which the car is to stop; pulsing means responsive to the registration and cancellation of said up and down landing calls for generating a positive pulse upon registration of a landing call and a negative pulse upon cancellation of a landing call; positive pulse detecting means; negative pulse detecting means; and counting mechanism operatively responsive to said positive and negative pulse detecting means for algebraically counting said positive and negative pulses for indicating the number of landing calls in registration at any given instant.

8. In an elevator installation in which an elevator car serves a plurality of landings; a plurality of landing call registering means, one for each of said landings and each including a touch button consisting of a cold cathode, gas electron tube having anode, cathode and control electrodes in a glass envelope, the latter two electrodes being electrically connected to each other, the anode-cathode circuits of said tubes being connected in parallel, said touch buttons being adapted to conduct in response to the touch of a human being on their respective glass envelopes to register the landing calls and to remain conductive after said touch is discontinued; call pickup mechanism for said car for initiating stopping of that car at landings for which landing calls are registered; call cancelling means responsive to operation of said call pickup means for cancelling the registration of the landing calls registered for landings at which the car is to stop by extinguishing the touch button tubes associated with such landings; signal producing means responsive to the registration and cancellation of said landing calls for generating a first certain signal upon registration of a landing call and a second certain signal upon cancellation of a landing call; means for detecting said first certain signals; means for detecting said second certain signals; and counting mechanism operatively responsive to both said detecting means for adding said first certain signals and subtracting therefrom said second certain signals, thereby indicating the number of landing calls in registration at any given instant.

9. In an elevator installation in which two or more elevator cars serve a plurality of landings, a plurality of first control means, one for each of said landings, for registering up landing calls in response to human touch; a plurality of second control means, one for each of said landings, for registering down landing calls in response to human touch; call pickup mechanism, one for each of said cars, for initiating, during upward travel of such car, stopping of such car at landings for which up landing calls are registered, and, during downward travel of such car, stopping of such car at landings for which down landing calls are registered; call cancelling means, one for each of said cars, responsive to operation of said call pickup means for the car with which it is associated for cancelling the registration of the landing calls registered for landings at which such car is to stop and for the direction of travel of said car; pulsing means responsive to the registration and cancellation of said up and down landing calls for generating a positive pulse upon registration of a landing call and a negative pulse upon cancellation of a landing call; positive pulse detecting means; negative pulse detecting means; and counting mechanism operatively responsive to said positive and negative pulse detecting means for algebraically counting said positive and negative pulses for indicating the number of landing calls in registration at any given instant.

10. In an elevator installation in which two or more elevator cars serve a plurality of landings; a plurality of first control means, one for each of said landings, for registering up landing calls in response to human touch; a plurality of second control means, one for each of said landings, for registering down landing calls in response to human touch; call pickup mechanism, one for each of said cars, for initiating, during upward travel of such car, stopping of such car at landings for which up landing calls are registered, and, during downward travel of such car, stopping of such car at landings for which down landing calls are registered; call cancelling means, one for each of said cars, responsive to operation of said call pickup means for the car with which it is associated for cancelling the registration of the landing calls registered for landings at which such car is to stop and for the direction of travel of said car; first pulsing means responsive to the registration and cancellation of said up landing calls for generating a positive pulse upon registration of an up landing call and a negative pulse upon cancellation of an up landing call; second pulsing means responsive to the registration and cancellation of said down landing calls for generating a positive pulse upon registration of a down landing call and a negative pulse upon cancellation of a down landing call; positive pulse detecting means, one for each of said pulsing means; negative pulse detecting means, one for each of said pulsing means; and counting mechanism operatively responsive to said positive and negative pulse detecting means for algebraically counting said positive and negative pulses for indicating the number of landing calls in registration at any given instant.

11. In an elevator installation in which two or more elevator cars serve a plurality of landings; a plurality of first control means, one for each of said landings, for registering up landing calls in response to human touch; a plurality of second control means, one for each of said landings, for registering down landing calls in response to human touch; call pickup mechanism, one for each of said cars, for initiating during upward travel of such car, stopping of such car at landings for which up landing calls are registered, and, during downward travel of such car, stopping of such car at landings for which down landing calls are registered; call cancelling means, one for each of said cars, responsive to operation of said call pickup means for the car with which it is associated for cancelling the registration of the landing calls registered for landings at which such car is to stop and for the direction in which the car is traveling; first pulsing means responsive to the registration and cancellation of said up landing calls for generating a positive pulse upon registration of an up landing call and a negative pulse upon cancellation of an up landing call; second pulsing means responsive to the registration and cancellation of said down landing calls for generating a positive pulse upon registration of a down landing call and a negative pulse upon cancellation of a down landing call; positive pulse detecting means, one for each of said pulsing means; negative pulse detecting means, one for each of said pulsing means; first counting mechanism operatively responsive to said positive and negative pulse detecting means associated with said first pulsing means for algebraically counting the positive and negative pulses generated by said first pulsing means for indicating the number of up landing calls in registration at any given instant; and second counting mechanism operatively responsive to said positive and negative pulse detecting means associated with said second pulsing means for algebraically counting the positive and negative pulses generated by said second pulsing means for indicating the number of down landing calls in registration at any given instant.

12. In an elevator installation in which an elevator car serves a plurality of landings; a plurality of landing call registering means, one for each of said landings and each including a touch button consisting of a cold cathode, gas, electron tube having anode, cathode and control electrodes in a glass envelope, the latter two electrodes being electrically connected to each other, the anode-cathode circuits of said tubes being connected in parallel, said touch buttons being adapted to conduct in response to the touch of a human being on their respective glass envelopes to register the landing calls and to remain conductive after said touch is discontinued; call pickup mechanism for said car for initiating stopping of that car at landings for which landing calls are registered; call cancelling means responsive to operation of said call pickup mechanism for cancelling the registration of the landing calls registered for landings at which the car is to stop by extinguishing the touch button tubes associated with such landings; pulsing means responsive to the registration and cancellation of such landing calls for generating a positive pulse upon registration of a landing call and a negative pulse upon cancellation of a landing call; positive pulse detecting means; negative pulse detecting means; and counting mechanism operatively responsive to said positive and negative pulse detecting means for algebraically counting said positive and negative pulses, thereby indicating the number of landing calls in registration at any given instant.

13. The combination set forth in claim 12 in which said pulsing means include a transformer having primary and secondary windings, the primary winding of which is connected in series with said parallel connected anode-cathode circuits of said touch button tubes; a resistor having one side connected to ground potential and being connected across said secondary winding; whereby conduction of any of said tubes causes a certain increase in current flow in said primary winding and extinguishment of any of said tubes causes a certain decrease in current flow in said primary winding, said transformer being adapted to produce across said resistor a voltage drop pulse of positive polarity with respect to ground in response to said certain increase and a voltage drop pulse of negative polarity with respect to ground in response to said certain decrease; and in which positive pulse detecting means include a first blocking rectifier and a first electromagnetic switch, having an actuating coil, said coil of said first switch and said first rectifier being connected in series from the other side of said resistor to ground potential, said first rectifier preventing said pulses of negative polarity from energizing said actuating coil of said first switch; and in which said negative pulse detecting means include a second blocking rectifier and a second electromagnetic switch, having an actuating coil, said coil of said second switch and said second rectifier also being connected in series from the other side of said resistor to ground potential, said second rectifier preventing said pulses of positive polarity from energizing said actuating coil of said second switch.

No references cited.